Patented Apr. 20, 1954

2,676,159

UNITED STATES PATENT OFFICE 2,676,159

PROCESS USING ACTIVATED SILICATE CLAY IN STYRENE-ALKYD REACTION

Frank Armitage, Chingford, England

No Drawing. Application May 22, 1951, Serial No. 227,730

12 Claims. (Cl. 260—22)

This invention is for improvements in or relating to the process of manufacturing homgeneous vinyl aromatic co-polymers, and is concerned particularly with the production of co-polymers of styrene and the substituted styrenes with the oil modified alkyd resins. We have already, in a number of prior patents, disclosed the co-polymerization of vinyl aromatic type compounds with oil modified alkyd resins utilizing a variety of different procedures designed to produce different products or to deal with particular difficulties which arise in connection with the production of compatible vinyl aromatic-oil co-polymers to render them suitable for use as media in the manufacture of coating compositions, impregnating compositions and like products such as printing and lithographing inks. In such prior patents, reference has been had to the use of the commonly available peroxide-type catalysts such as benzoyl peroxide and tertiary butyl peroxide.

There is another class of catalysts which has been utilized in polymerization reactions, namely the so-called activated silicate catalysts. These catalysts have been utilized in connection with the production of low molecular weight polymers of styrene and alpha-alkyl substituted styrenes as described in prior British specification No. 524,156. It has also been proposed to use such catalysts for polymerizing styrene in the presence of phenols for the production of oil-soluble phenol-styrene resins.

The present invention is based upon the discovery that by effecting the co-polymerization of styrene and its analogues with oil-modified alkyd resins in the presence of such catalysts, homogeneous vinyl aromatic-oil co-polymers having improved compatibility with other film-forming materials are obtained. It has also been found that such copolymers can be produced in a considerably lesser reaction time than is the case when no catalyst at all is employed or when the conventional peroxide catalyst, such as benzoyl peroxide, is employed.

Throughout this specification, reference will be had to the expression "oil-modified alkyd resins." Such resins comprise the reaction product of a vegetable or marine oil or the fatty acids derived therefrom with a polybasic acid and a polyhydric alcohol such as glycerol, pentaerythritol, mannitol, sorbitol and the like. The usual procedure in making such oil modified alkyds is to react glycerine or other such polyhydric alcohol with a polybasic acid, e. g., phthalic anhydride, and fatty oil acids or partial esters thereof. This expression is further used to include those alkyd resins where the synthetic drying oils, e. g., dehydrated castor oil and isomerized drying oils, are employed as the modifying agent. In general, the unsaturated fatty acid radicals appearing in the synthetic and naturally occurring drying oils will contain from 12 to 30 carbon atoms. In like manner the fatty acids derived from such synthetic or naturally occurring drying or semi-drying oils or mixtures thereof may be employed as the modifying agent. While in the preferred instances modifying oils which are of the drying or semi-drying type are employed, it should be pointed out that broadly this invention comprises alkyds which are modified entirely or in part, through the use of a mixture of oils, with non-drying oils such as castor oil. In making an alkyd from castor oil, some dehydration will occur in the process lending drying properties to the final material.

Throughout this specification, the expression "activated silicate catalyst" is used to mean activated bleaching earth such as acid activated clays and acid activated hydrosilicates among which there may be mentioned as examples fuller's earth, Tonsil, Attapulgus clay, the colloidal clays such as bentonite or montmorillonite and the various silicate gels.

The vinyl aromatic compounds useful in accordance with the present invention are preferably monovinyl aromatics. It is, therefore, contemplated that materials which contain a phenyl or naphthyl radical in combination with a vinyl group, and otherwise structurally similar to styrene is the general class of starting materials for use in this invention. As indicated above, the phenyl group may contain substituents, for example, fluorine, chlorine, methoxy, methyl, trichloromethyl or trifluoromethyl. Specific examples of vinyl phenyl compounds include styrene itself, para-methyl styrene, para-chlorostyrene, para-fluorostyrene, meta-chlorostyrene, meta-fluorostyrene, meta and para trichloromethyl-styrene, meta and para trifluromethylstyrene, methoxystyrene, vinyl naphthalene, and the like. Alpha substituents on the vinyl radical are to be avoided if the advantage of rapid polymerization time is to be achieved.

Broadly stated, therefore, this invention is in the provision of a new and useful process for the manufacture of vinyl aromatic-oil co-polymers which comprises heating a vinyl aromatic such as styrene, or a nuclear alkyl and/or halogen-substituted styrene, with an oil-modified alkyd resin made from an oil selected from the group consisting of drying and semi-drying oils, a polyhydric alcohol, and a polybasic acid, in the presence of from about 1% to about 5% by weight of the vinyl aromatic of an activated silicate at a temperature of from about 70 to about 200° C., the amount of vinyl aromatic employed being sufficient to provide a vinyl aromatic content in the final product of from 25% to about 50%. Although the co-polymerization reaction is desirably carried out in the absence of a mutual solvent such as xylene, nevertheless the reaction may be carried out in the presence of such a solvent for the vinyl aromatic and the polyhydric alcoholic ester. In general the low molecular weight aromatic hydrocarbons such as benzene, toluene, and xylene are suitable for this purpose.

Since the co-polymerization reaction, when catalyzed by these activated silicate catalysts, tends to be somewhat exothermic, it is desirable to limit the vinyl aromatic content of the reaction mixture in order to avoid the reaction becoming uncontrollable. According to this invention, therefore, the amount of vinyl aromatic, such as styrene, or substituted styrene, is from 25 to 50% by weight of its admixture with the polyhydric alcoholic ester. Substantially higher amounts of the vinyl aromatic have been found to result in co-polymers which are unsuited for use as vehicles in the coating compositions mentioned above. The co-polymers produced within the range of proportions mentioned above are more highly compatible with other film-forming materials than co-polymers containing a greater proportion than 50% by weight of the vinyl aromatic, e. g., styrene.

The amount of activated silicate catalyst employed is preferably from about 1% to about 5% by weight of the vinyl aromatic, but although the co-polymerization reaction may be effected at temperatures in the range of 70° C. to 200° C., it is preferred to conduct the reaction in the temperature range of from about 130° C. to about 180° C. Most conveniently, the co-polymerization reaction is effected by heating the reaction mixture under reflux.

The advantages accruing in the products as the result of the practice of this process are that, particularly when such products are prepared in the absence of solvents, they are homogeneous thereby differing from certain products formed in the absence of any catalyst, or in the presence of certain other catalysts. Moreover, although such homogeneous co-polymers may be formed by carrying out the reaction between styrene or a nuclear substituted styrene in the presence of alpha-methyl styrene or similar alpha-alkyl styrenes, or in the presence of sulphur or sulphur dioxide, the use of such additional substance usually considerably extends the time required for effecting a substantially complete co-polymerization reaction and, furthermore, such additional substances are not always successful in connection with the co-polymerization of styrene or the like with oil-modified alkyd resins. A principal difficulty with the styrenated alkyds is their substantial incompatibility with other film-forming materials such as linseed oil, tung oil, and other such drying oils, or oil modified alkyd resins. Although there was no reason to believe or expect that co-polymers produced using a different catalyst from the conventional catalyst mentioned above would have any different compatibility properties with ordinary film-forming ingredients, it has been found most unexpectedly that the co-polymers produced in accordance with this invention are compatible with the usual film-forming ingredients yielding stable solutions therewith.

Another important economic advantage of the present invention is that, by the use of the activated silicate catalysts in the absence of a solvent, the reaction time required to effect co-polymerization of at least 75 to 80% of the styrene in the reaction mixture is very considerably reduced as compared with the reaction time required by conventional methods.

It is believed that the increased compatibility of the co-polymers resulting from the practice of this invention arises from the general lowering of the average molecular weight of the co-polymer produced by the process of the present invention. This, in some instances, results in the product having a rather prolonged drying time for films produced from the products of the present invention, and the films may also be somewhat softer than the films which are capable of being produced by other methods from the same co-polymerizable ingredients. In view, however, of the greatly improved compatibility of the products of the present invention, these increased drying times and the increased softness of film are readily compensated for by blending the products of the present invention with existing available film-forming materials to produce a blended product in which these disadvantages can be substantially completely eliminated if desired.

The following examples illustrate the mode in which the invention may best be carried into effect:

EXAMPLE 1

This example illustrates the procedure when applied to alkyd resins, to produce a product containing 35.9% co-polymerized styrene.

An oil modified alkyd resin was produced by heating together 369 grams of raw castor oil, 195 grams of phthalic anhydride, and 90 grams of glycerol. These substances were heated to a temperature of 270° C. during a period of 1 hour and the reaction mixture was held at that temperature for an additional 3 hours during which time a stream of carbon dioxide was blown through the reaction mixture. Thereafter the reaction mixture was allowed to cool spontaneously. 875 grams of the alkyd thus prepared were mixed with 600 grams of styrene and 12 grams of fuller's earth were added to the mixture. Heat was then applied to the reaction vessel and the reaction mixture stirred until the temperature rose to 130° C. at which point the heating was cut off and the temperature allowed to rise to 170° C. due to the exothermic reaction. Thereafter the temperature slowly fell to 150° C., the rise and fall in temperature requiring a period of 1.5 hours. Examination of the reaction mixture showed that 80% of the styrene contained therein had co-polymerized with the oil-modified alkyd resin.

The reaction mixture was dissolved in 175 cc. of xylene and filtered to remove the suspended clay. The residual solution was clear and when admixed with cobalt driers poured to produce a clear, air-drying film.

EXAMPLE 2

This example illustrates the procedure with a different oil-modified alkyd resin, the final product containing about 33% by weight of co-polymerized styrene.

An oil-modified alkyd resin was produced by reacting 201 lbs. of phthalic anhydride, 105 lbs. of glycerol, 202 lbs. of linseed oil fatty acids and 106 lbs. of wood oil. These quantities were charged into a reaction vessel and heated to a temperature of 238° C. over a period of 1.5 hours. The reaction mixture was held at this temperature for a period of 3 hours and was thereafter cooled to 120° C.

39 gallons of monomeric styrene were then added to the reaction mixture and 12 lbs. of fuller's earth stirred in. This mixture was heated over a period of 2 hours at a temperature of 150° C. with stirring, and was held at this temperature for an additional period of 6 hours. The reaction mixture was then allowed to cool and was thinned by the addition of 90 gallons of xylene. The solution was then filtered to remove suspended clay. The clear, residual solution was found to contain 83% of the styrene originally charged in the form of the co-polymer with the oil-modified alkyd resin.

When this reaction mixture has been treated with cobalt driers, clear films, which were dried, could be poured therefrom.

EXAMPLE 3

A mixture of 1200 grams of castor oil, 308 grams of phthalic anhydride and 140 grams of glycerine was heated to 520° F. in 1 hour and held at this temperature for 0.5 hr. 400 grams of linseed oil were added slowly over 0.25 hr. at the same batch temperature and the resulting mass maintained at this temperature for 3.25 hrs. The resultant alkyd had an acid value of 4.3 and a viscosity of 12 poises.

EXAMPLE 4

144 grams of the alkyd of Example 3, 156 grams of styrene and 300 grams of xylene were refluxed for 20 hrs. at 146–150° C. The styrene conversion was 92% yielding a styrenated alkyd containing 50% styrene. No clay catalyst was used.

EXAMPLE 5

240 grams of the alkyd of Example 3, 260 grams of styrene and 5.2 grams of activated clay were admixed and heated to 140° C. with mechanical stirring. The heat source was removed and the temperature rose spontaneously to 195° C. The mass was allowed to cool at 150° C. where it was maintained for 2 hrs. The product was found to contain 49.0% styrene. Afterwards, the product was dissolved in xylene at 50% solids and the clay removed by filtration.

EXAMPLE 6

Another product made without clay catalyst resulted from the reaction of 240 grams of the alkyd of Example 3 and 260 grams of styrene. The mass was heated to 145° C. and the temperature allowed to rise gradually over a period of 5.25 hrs. to 250° C. This product contained 52% styrene.

The foregoing examples are illustrative of the process of this invention and show the sequence of steps as being essentially the same in each case. It is clear, therefore, that these steps are applicable to other drying oil or semi-drying oil-modified alkyds, such as, modified polyhydric alcohol-polybasic acid alkyd resins in which the modifying agent is a fatty acid derived from or a drying oil, such as, dehydrated castor oil, soya bean oil, oiticica oil, safflower oil, menhaden oil, sardine oil, chia oil, cottonseed oil, and the like, and mixtures of such drying oils.

The following tables shows the compatibilities of the drying oil-modified alkyd co-polymers, produced by the process of the present invention with other film-forming ingredients.

The following table shows the comparison of the compatibility of the styrene-oil modified alkyd co-polymers produced in accordance with Examples 1 and 2 taken in comparison with the similar styrene oil-modified alkyd co-polymers produced without the use of the silicate catalyst:

Table I

| | A | B | C | D | E | |
|---|---|---|---|---|---|---|
| 60% | C | O | — | C | O | 60% oil-length linseed oil modified alkyd resin. |
| 30% | C | O | C | C | slO | |
| 23% | C | O | C | C | slO | |
| 17% | C | O | C | C | C | |
| 9% | C | O | — | C | O | |
| 30% | C | O | slO | C | slO | 50% oil-length dehydrated castor oil modified alkyd resin. |
| 23% | C | O | slO | C | slO | |
| 17% | C | O | slO | C | C | |
| 9% | C | slO | C | C | C | |
| 60% | — | — | — | C | O | 42% oil-length linseed oil modified alkyd resin. |
| 30% | C | — | — | C | slO | |
| 23% | C | — | — | C | slO | |
| 17% | — | — | — | C | slO | |
| 9% | — | — | — | C | slO | |
| 30% | C | — | — | C | slO | 65% oil-length dehydrated castor oil modified alkyd resin. |
| 23% | C | — | — | C | slO | |
| 17% | C | — | — | C | slO | |
| 9% | C | — | — | C | C | |
| 30% | C | — | O | C | O | 55% oil-length linseed oil/wood-oil modified alkyd resin. |
| 23% | C | — | O | C | slO | |
| 17% | C | — | slO | C | C | |
| 9% | C | — | C | C | C | |
| 30% | C | O | slO | C | O | 45% oil-length dehydrated castor oil modified alkyd resin. |
| 23% | C | slO | slO | C | slO | |
| 17% | C | slO | slO | C | slO | |
| 9% | C | slO | C | C | C | |

In the above table the symbols used have the following significance:

O means opalescent film,
slO means slightly opalescent film, and
C means clear film.

The figures under the various vertical columns are in respect of the blending of the oils shown in the right-hand part of the table in the percentages indicated with the various co-polymers as follows:

A represents the product of Example 1,
B represents the product obtained by the process of Example 1 but omitting the use of the activated silicate catalyst, and reacting in solution in xylol,
C is a comparable product to B but produced in the presence of benzoyl peroxide as catalyst,
D is the product of Example 2 and
E represents the product obtained by the process of Example 2 but omitting the use of the activated silicate catalyst, and reacting in solution in xylol.

It will be seen from the results of the table given above that the co-polymers produced with the aid of the activated silicate catalysts show a higher degree of compatibility with other film-forming products than the comparable styrene co-polymers produced otherwise than by the use of the activated silicate catalysts.

Although the examples only illustrate the co-polymerization of styrene with oil-modified alkyd resins utilizing only glycerol as the polyhydric alcohol, it will be understood that the invention may be carried out without significant alteration while using nuclear alkyl and nuclear chloro-substituted styrenes such as the methyl and ethyl nuclear substituted styrenes and, instead of the glycerol, other polyhydric alcohols may be employed such as pentaerythritol, mannitol or sorbitol; furthermore, in place of the drying oils and drying oil fatty acids referred to in the examples, there may be employed the fatty acids of semi-drying or non-drying oils while the acids of natural resins, such as rosin or copal, may also be employed. It will further be understood that in place of the phthalic anhydride employed in the manufacture of the alkyd resins, other polybasic acids, such as maleic acid, may be used.

In the following table, the products of Examples 4, 5, and 6 are compared for compatibility in a 60% oil length linseed alkyd (60% solution in xylene), in the alkyd of Example 3, and in a 30 poise linseed stand oil. Films were drawn down of the mixtures indicated in terms of parts and the characteristics of the dried films noted. The results are noted as Excellent, Good, Fair, Poor, Incompatible. An opaque film would be graded poor and a good film would have but slight opalescence. Excellent is the rating applied to a clear film or one showing only a trace of opalescence. Cobalt drier was added to all solutions before casting the films.

Table II

| Linseed Alkyd | Product Ex. 3 | Linseed Stand. Oil | Product Ex. 5 | Product Ex. 6 | Product Ex. 4 | Rating Film |
|---|---|---|---|---|---|---|
| 5 | | | 9 | | | Good. |
| 10 | | | 2.5 | | | Excellent. |
| | 4 | | 12 | | | Good. |
| | 10 | | 4 | | | Excellent. |
| | | 4 | 12 | | | Good. |
| | | 10 | 4 | | | Do. |
| 5 | | | | 9 | | Incompat. |
| 10 | | | | 2.5 | | Incompat. |
| | 4 | | | 12 | | Poor. |
| | 10 | | | 4 | | Incompat. |
| | | 4 | | 12 | | Incompat. |
| | | 10 | | 4 | | Incompat. |
| 5 | | | | | 9 | Incompat. |
| 10 | | | | | 2.5 | Incompat. |
| | 4 | | | | 12 | Incompat. |
| | 10 | | | | 4 | Incompat. |
| | | 4 | | | 12 | Incompat. |
| | | 10 | | | 4 | Incompat. |

The foregoing table shows clearly the definite advantages obtained with products made according to this invention as compared with almost identical products, insofar as styrene content is concerned, which are made without a clay catalyst.

Other modes of applying the principle of this invention may be employed instead of those specifically set forth above, changes being made as regards the details herein disclosed, provided the elements set forth in any of the following claims, or the equivalent of such be employed.

I, therefore, particularly point out and distinctly claim as my invention:

1. A process for producing vinyl substituted aromatic compound oil-modified alkyd co-polymers comprising heating together a monovinyl aromatic compound selected from the group consisting of unsubstituted monovinyl aromatic hydrocarbons, nuclear alkyl substituted and nuclear chloro substituted monovinyl aromatic hydrocarbons and an oil-modified alkyd resin in which the oil-modifying material is selected from the group consisting of drying and semi-drying vegetable oils in the presence of from about 1% to about 5% by weight of the monovinyl aromatic compound of an activated silicate clay at a temperature of from about 70° C. to about 200° C., the amount of monovinyl aromatic vinyl compound employed being sufficient to provide a monovinyl aromatic compound content in the final product of from about 25% to 50%.

2. A process in accordance with claim 1 in which the modifying oil used in making the oil-modified alkyd resin is a conjugated drying oil.

3. A process in accordance with claim 1 in which the modifying oil used in making the oil-modified alkyd resin is a conjugated diene drying oil.

4. A process in accordance with claim 1 in which the modifying oil used in making the oil-modified alkyd resin is a conjugated triene drying oil.

5. A process in accordance with claim 1 in which the modifying oil used in making the oil-modified alkyd resin is a mixture of drying oils.

6. A process in accordance with claim 1 in which the oil-modified alkyd resin is a castor oil modified alkyd resin.

7. A process in accordance with claim 1 in which the oil-modified alkyd resin is a mixed tung and linseed oil modified alkyd resin.

8. A process in accordance with claim 1 in which the monovinyl aromatic compound is a vinyl benzene.

9. A process in accordance with claim 1 in which the monovinyl aromatic is styrene.

10. A process in accordance with claim 1 in which the temperature of the reaction is from 130° C. to 180° C.

11. A process in accordance with claim 1 in which the temperature of the reaction is reflux temperature.

12. A process for producing a styrene-oil co-polymer which comprises heating together styrene and a castor oil modified alkyd in proportions substantially equivalent to the following: 875 parts of castor oil modified alkyd and 600 parts of styrene in the presence of 12 parts of fuller's earth at a temperature of from about 130° C. to about 170° C. for a period of about 1.5 hours.

References Cited in the file of this patent

UNITED STATES PATENTS

| Number | Name | Date |
|---|---|---|
| 2,392,710 | Wakeford et al. | Jan. 8, 1946 |
| 2,395,504 | Rubens et al. | Feb. 26, 1946 |
| 2,561,313 | Malinowski | July 17, 1951 |

FOREIGN PATENTS

| Number | Country | Date |
|---|---|---|
| 524,156 | Great Britain | July 31, 1940 |